United States Patent Office 2,711,892
Patented June 28, 1955

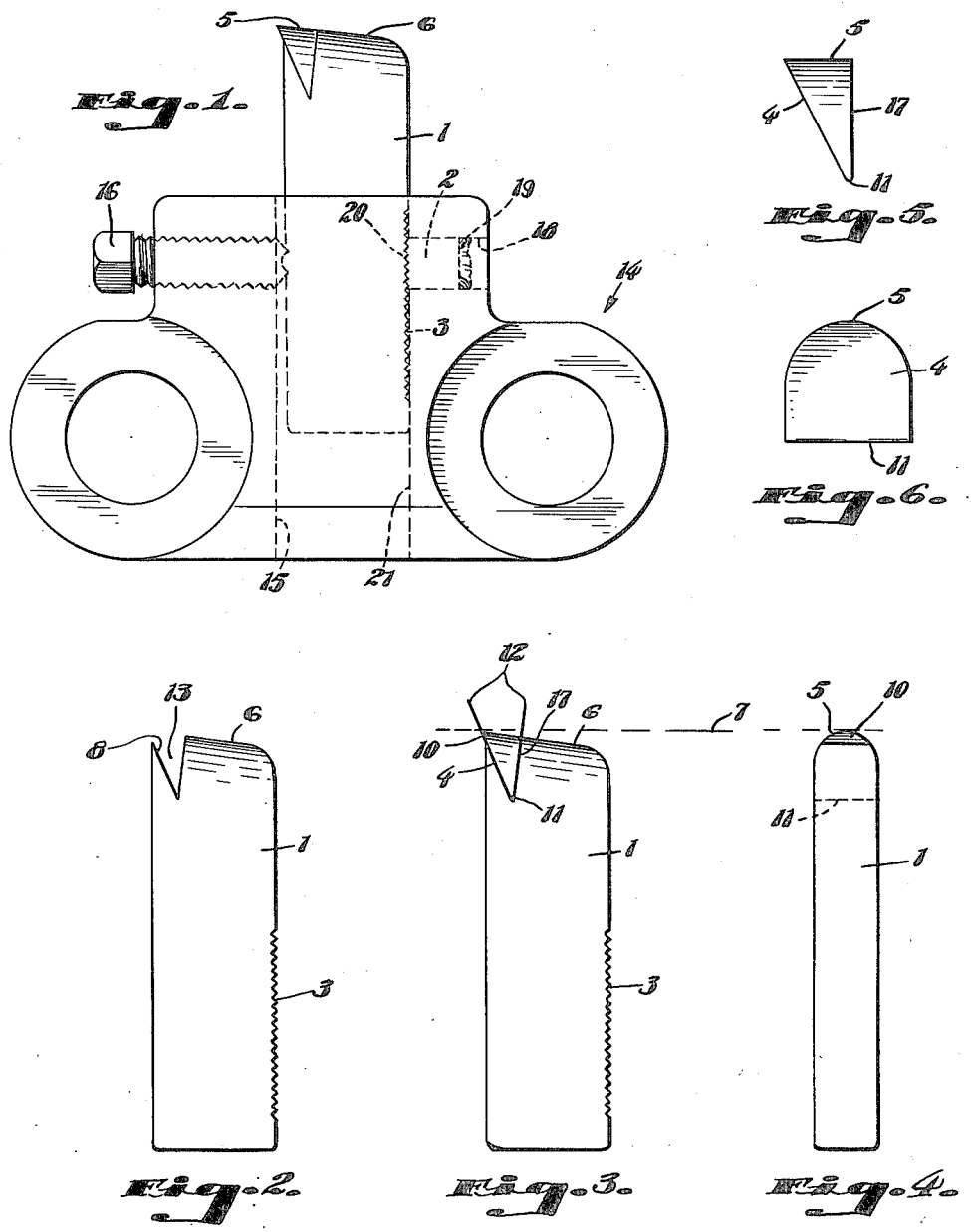

2,711,892

COAL CUTTING BIT HAVING CARBIDE INSERT

Frank L. Fulke, Terre Haute, Ind.

Application October 4, 1950, Serial No. 188,378

4 Claims. (Cl. 262—33)

My invention relates to coal cutting chains and their tool carrying links in which cutter bits are secured by set screws in link sockets and the links are adaptable for circulating about the cutterbar of a mining machine. In particular the invention relates to steel bits having expensive tungsten carbide inserts bonded to their cutting ends.

A prime object of the invention is to substantially reduce the weight, therefore the cost, of an effective insert that will be satisfactorily heavy at its working end and no more than necessarily heavy at all other points.

A further object is to provide for more securely bonding the insert to the steel body of the bit in wedgelike manner with walls of steel strongly supporting the insert against rearwardly-delivered as well as frontally delivered shocks upon the insert.

A further object is to take favorable advantage of the unequal rates of shrinkage of steel and tungsten carbide for obtaining a very powerful shrinkage grip of the steel upon the insert.

A further object is to eliminate wasteful grinding away by expensive diamond grinding wheels of the expensive insert after bonding it with adjacent surfaces of the steel bar, by providing for the insert to properly line up and cooperate with the steel bar surfaces without the necessity of subsequent grinding of the insert.

A further object is to provide for the convenient and accurate manufacture of my improved bit at lowest possible cost and thereby be able to reduce their cost to coal mines employing such bits.

These and other objectives may readily become apparent from the following description and reference to the drawings, in which:

Fig. 1 is a side elevation of a bit carrying link for use in a cutter chain,

Fig. 2 is a side elevation of the body of my improved bit,

Fig. 3 shows the carbide insert in position ready to be brazed,

Fig. 4 is a front view of the bit,

Fig. 5 is a magnified side elevational view of the carbide insert, and

Fig. 6 is a magnified front elevational view of the insert.

It is to be understood that the problems involved in the application of cutting bits having hard tungsten carbide inserts for coal cutting are complicated by certain adverse factors specifically involved in the cutting of coal. Of primary importance are the extreme impacts upon the inserts when bits moving at 700 feet per minute encounter sulphur impurities harder than steel. Important also is the fact that these extreme impacts may be lateral as well as frontal and may even come from directly rearward if the chain "hangs up" and its direction of travel is reversed. A very exacting factor is the fact 40 to 50 of the expensive bits worth a dollar or more each, are simultaneously at work, in the dark, in one cutter chain. The problems of satisfactorily bonding the inserts to the bits and securing the bits in the links against loss, are therefore peculiarly acute in coal cutting.

In Fig. 1 a coal cutting chain link 14 has a broached socket 15 for supporting a rectangularly shaped steel bit body 1 having a tungsten carbide insert 5 bonded into body 1 at its cutting end 6. A cut-point set screw 16 secures the bit body in socket 15 by biting a ring into the metal of the body 1, and this of course is a conventional construction.

However this conventional method of securing bits, and particularly expensive bits with tungsten carbide inserts, has serious shortcomings. The bit body 1 must be hardened to adequately resist bending forces and also compressive force of the hard insert, since the steel must not be soft enough to yield under impacts upon the insert. Therefore the bodies of carbide insert bits in general use are of a hardness approximating 42 Rockwell C scale.

The set screw 16 naturally must be harder than the bit since its sharp cup point is required to bite into the bit. However the screw will break under the extreme torsional stress imposed by the full strength of a man using a 15 inch wrench, if the screw is hardened beyond approximately 52. Under such conditions the sharp nose of the cup point will not very long remain sharp enough to bite into the bit. The screw nose is forced to rotate and scour against the hard bit several times daily at extreme pressure, and the sharp edge soon becomes flatted. When this happens only a frictional pressure remains since the screw can no longer bite, therefore loss of bits from the chain will occur.

In order to obviate this loss of bits I provide in my link an aperture 18 axially aligned with screw 16 and I permanently secure in aperture 18 as by welding 19 a plug 2 having a sharply serrated face 20 and I gauge this plug so that its knifelike serrations 20 will project forwardly of the rear wall 21 of broached socket 15 about $\frac{1}{32}$ inch. This plug 2 may be hardened by nitriding to have a hardness of about 65, far beyond the 42 hardness of the bit. In this way the pressure of screw 16 will always force the back side of the bit to impale itself upon sharp serrations 20 so that these serrations will bite into the bit about $\frac{1}{32}$ inch and positively hold the bit against loss, even if the screw nose flattens. This would be true when my special plug 2 is used with any conventional mine sharpened bit or any carbide insert bit. However in my own improved bit I may provide a serrated rear side 3 of my bit, formed by the stroke of a press by using a serrated hardened die, to insure extremely positive cooperation with the serrations 20 of plug 2. In other words my link 14 will readily cooperate with bits of other manufacturers by the forced impaling of the bit upon serrations 20 of my plug 2 while with my own bit it will cooperate by the positive meshing of the serrations 20 of plug 2 with like serrations 3 preformed upon the rear side of my bit.

As seen clearly in Fig. 2 a V-shaped notch 13 is cut across the end of a bar of steel and this may be economically and accurately done by stacking a plurality of the bars side-by-side and traversing them with an angular milling cutter. This notch 13 will receive the tungsten carbide insert shown in Figs. 5 and 6.

It will be noted that, in front elevation, the upper edge portion 5 of the carbide insert is rounded correspondingly to rounded edge 6 of the steel bar, that, in side elevation, the back side 17 of the insert is at right angles to its rounded edge 5, that the front face 4 of the insert is approximately the hypotenuse of a triangle in which the back side 17 and the short upper side 5 form a right angle, and the front face 4 forms an acute angle with the back side 17, the angle included between the front face 4 and the side 5 being greater than the angle included between the front face 4 and the back side 17.

The notch 13 is formed at a correspondingly acute angle, whereby the insert will be supported in the notch in wedgelock manner.

This construction has a valuable bearing upon the effectiveness of attaching the insert by braze bonding in several ways. A solid wall of steel braces most of the front face 4 against shocks from rearwardly whenever the chain travel is reversed. In the brazing process a thin strip 12 of braze metal, coated with brazing flux, and formed in a V is introduced into notch 13, and after the tungsten carbide is inserted the assembly is brought into the coil of an induction heater with a properly tensioned finger applying pressure upon the exposed tip of the insert. Thus when the braze metal melts both sides of the insert will be firmly bonded to their respective steel walls of notch 13 with only a properly thin layer of the braze metal separating them. This cannot be said of a rectangular insert bonded into a milled rectangular slot, since it is impossible to hold either the slot width or the insert thickness tolerance exactly enough. A tungsten carbide insert is a pressed quantity of powder of no uniformly exact thickness and a rectangular slot must be formed with a cutter which loses width as its side clearance is ground for sharpening the cutter. An angular cutter used for making slot 13 however will hold its exact angle when sharpened. All these problems of accuracy in production and effectiveness of the bond are practicably answered by the wedge-like application. A further and highly desirable advantage is secured from the fact of unequal shrinkage of tungsten carbide and steel, the carbide shrinking much less. This means that as the brazed assembly cools the walls of the notch will shrink upon the insert to establish a very powerful shrinkage grip. In conventional applications of inserts of tungsten carbide this unequal shrinkage often presents danger of rupture of the bond.

A further valuable advantage in cost-reduction is derived from the fact that the rounded edge 5 of the insert lines up exactly with the rounded edge 6 of the steel bar, since the back side 17 of the insert is inclined, not forwardly of the long axis of the steel bar as is customary in such coal cutting bits, but leaning rearwardly of said axis and at right angles to the rounded edge 6 which is at an acute angle with the line of cutting 7. If, as conventionally, back side 17 was inclined forward of said long axis, a considerable projecting mass of tungsten carbide must be ground away to line up edge 5 of the insert with edge 6 of the steel bar. This grinding, besides being wasteful of tungsten carbide and diamond grinding wheels, could also crack the brazed bond by the heat and sudden expansion and contraction involved.

Of very great advantage in the present invention, is the approximate halving of the cost of the tungsten carbide insert. This material is expensive in the order of $25.00 per pound, and is much heavier than steel. If my insert front face 4 were parallel with its back side 17, as customarily, it would cost about 35 cents in large quantities, and since the weight of my insert will be less than half, its cost may be approximately half. Yet the efficiency of the insert will very closely approximate that of a conventional one twice as costly, since its cutting end is just as heavy to start and the thickness will decrease very slowly as the insert is progressively ground to resharpen it. And it will be apparent that as the insert is ground down and decreases in thickness, the steel walls supporting the insert against shocks are progressively increasing in thickness.

It will also be noted that the front face of the insert is inclined forwardly to serve as a cutting face, without the necessity of any grinding. The forward wall 8 of notch 13 covers and supports and is firmly bonded to a major portion of the front face of the insert, only a very minor surface 10 being left exposed. It is to be noted that although the lower edge 11 of the carbide insert is illustrated as a knife-like edge, it cannot in practice actually be so and the scope of my invention contemplates the insert having some thickness at this lower edge. Since the insert is pressed from powdered materials it would be manifestly impossible to produce and handle it with a perfectly sharp edge.

I claim:

1. A bit for coal cutting chains comprising a bar of steel having a rectangular shank and a cutting head having a V-shaped notch transverse its extremity and opening through the forward face of said head, said notch defining a pair of flat walls each extending to an external surface of said head and meeting at an acute angle, the front said wall inclining forwardly and toward said extremity at an acute angle to a plane parallel with the long axis of said bar and extending from the base of said notch toward said extremity, and the rear said wall inclining rearward and toward said extremity at an acute angle to said plane, a tungsten carbide insert braze bonded to both said walls, said insert projecting from said notch and being defined in the side elevation by lines of a right angle triangle of which the hypotenuse is that face of said insert which is bonded to the front wall of said V-shaped notch.

2. A bit for coal cutting chains comprising a steel body and an insert of tungsten carbide braze bonded into a V-shaped notch in said body opening through the front face and the upper end of said head, said insert in side elevation bounded by the lines of a right angle triangle of which the rear upper corner is the 90 degree angle, the front upper corner is an acute angle constituting the cutting edge of the insert, the front and rear faces of said insert downwardly converging in planes intersecting at an angle less than either of the other two said angles, the front face of said insert inclining forwardly and toward the upper end of said bar at an acute angle to a plane parallel with the long axis of said bar and extending from the base of said notch toward said end, and the upper edge of said insert inclining downwardly and rearwardly at an acute angle to a plane normal to said first-named plane.

3. As an article of manufacture a coal cutting bit comprising a rectangular bar of steel having front and rear surfaces approximately half the width of its sides and having a V-shaped notch extending across its cutting end transverse its sides and said notch providing flat front and rear faces intersecting external surfaces of said bar, said front face forwardly inclining at an acute angle and said rear face rearwardly inclining at an acute angle, both said angles respective to a plane extending from the base of said notch toward said cutting end and parallel with the long axis of said bar, a tungsten carbide insert substantially triangular in side elevation braze bonded against both said faces, that end of said steel bar bearing said notch receding rearwardly of said notch at an angle acute to the short axis of said bar.

4. A bit for coal cutting chains comprising an integral body having a front face and a rear face parallel therewith, said body terminating in an active end inclined, relative to said faces to provide cutting clearance therefor, said bit body having a notch opening through said end and defined by a rear wall perpendicular to said inclined end and a front wall intersecting said bit front face and angularly related to said rear wall to a degree less than the degree of its angular relation to said end, and a tungsten carbide insert, having front and rear surfaces parallel respectively with the front and rear walls of said notch, said insert being seated between, closely fitting, and bonded to said notch walls, said insert having an active end lying flush with said bit body active end and having a portion of its front face exposed beyond said notch front wall.

(References on following page)

References Cited in the file of this patent

UNITED STATES PATENTS

| | | |
|---|---|---|
| 1,332,745 | Oakes | Mar. 2, 1920 |
| 1,777,515 | Cartlidge | Oct. 7, 1930 |
| 1,960,879 | Russell et al. | May 29, 1934 |
| 2,394,813 | Simmons | Feb. 12, 1946 |
| 2,483,220 | Morrow | Sept. 27, 1949 |
| 2,521,089 | Phipps | Sept. 5, 1950 |
| 2,575,980 | Simmons | Nov. 20, 1951 |

FOREIGN PATENTS

| | | |
|---|---|---|
| 585,396 | Germany | Nov. 21, 1930 |
| 285,682 | Great Britain | Apr. 18, 1939 |